UNITED STATES PATENT OFFICE.

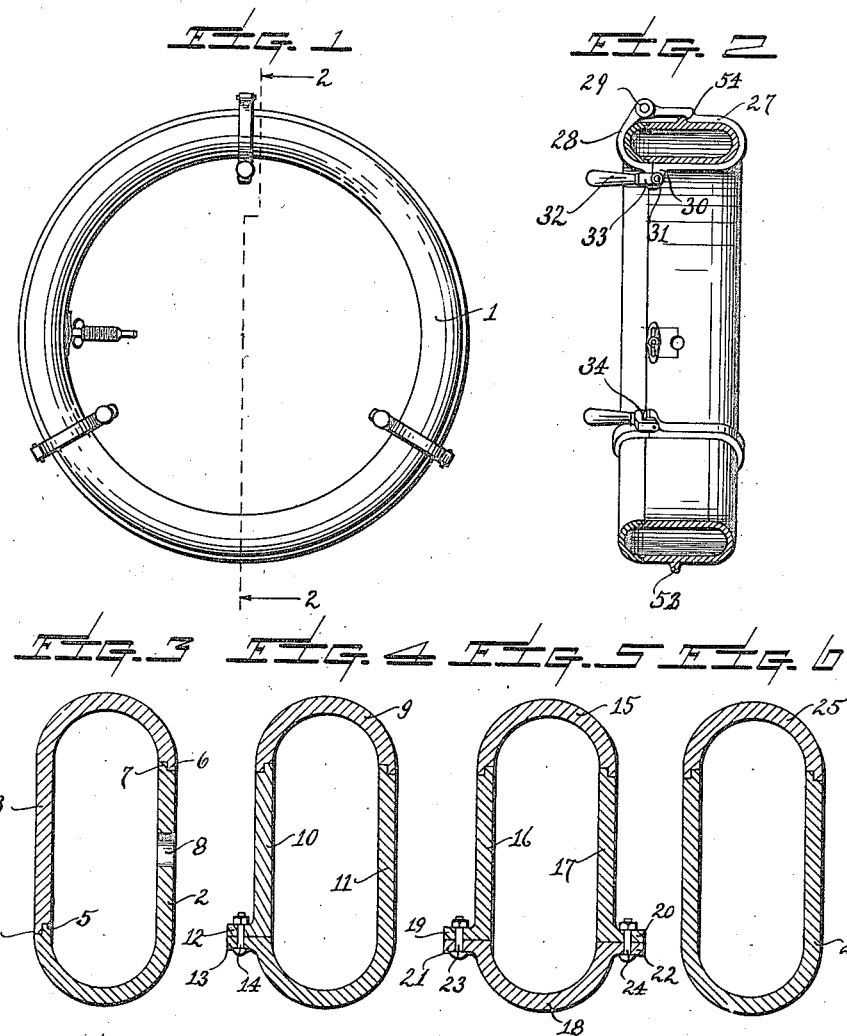

WALTER L. FAIRCHILD, OF NEW YORK, N. Y.

MOLD FOR PNEUMATIC TUBES AND SIMILAR ARTICLES.

1,423,761.  Specification of Letters Patent.  Patented July 25, 1922.

Application filed September 3, 1920. Serial No. 408,018.

*To all whom it may concern:*

Be it known that I, WALTER L. FAIRCHILD, residing at New York, in the county and State of New York, have invented certain new and useful Improvements in Molds for Pneumatic Tubes and Similar Articles, of which the following is a specification.

This invention relates to improvements in molds for pneumatic tires and similar articles of manufacture. One of the objects of the invention is to provide a new and improved mold for the tubes of pneumatic tires. Another object of the invention is to produce a new and improved mold such that the positioning of the unvulcanized tube therein and its removal therefrom are more easily effected than it has been possible to perform these operations in molds of this character as hitherto.

Other aims and objects of the invention more or less specific than those referred to above will be in part obvious and in part pointed out in the following description of the elements, combinations, arrangement of parts and applications of the principles constituting the invention, and the scope of the protection contemplated will be indicated in the appended claims.

In the accompanying drawing wherein I have illustrated a preferred embodiment of my invention:

Fig. 1 is a view in elevation of one of my improved molds.

Fig. 2 is a vertical sectional view taken on line 2—2 of Fig. 1, looking in the direction of the arrows.

Fig. 3 is a transverse sectional view taken through one form of mold.

Fig. 4 is a center view showing a modified form of mold.

Fig. 5 is a similar view showing a further modified form of mold.

Fig. 6 is a similar view showing still another form of mold.

Fig. 7 is a similar view showing the mold employed in Fig. 6 with a tube located therein and the manner of removing the tube with its valve stem from the mold, said view being taken substantially on line 7—7 of Fig. 8 looking in the direction of the arrows.

Fig. 8 is a plan view of the construction shown in Fig. 7 and

Fig. 9 is a sectional view taken on the line 9—9 of Fig. 8.

Referring now to the drawing wherein similar reference characters refer to similar parts throughout the several views thereof, the reference numeral 1 denotes my improved mold, the mold as a whole being of circular formation, but of elliptical cross-section, as shown in Figs. 2 to 7 inclusive. The mold itself may be constructed in various ways, although I prefer the forms illustrated in Figs. 3 to 6 inclusive. In fact, in active practice, I prefer the form of mold illustrated in Fig. 5.

In Fig. 3 it will be noted that the mold is formed in two parts, 2 and 3 respectively, and that the meeting edges of the parts have opposed seats and flanges indicated at 4—5, and 6—7, the parts being so milled and machined that they fit together to a nicety. An aperture 8 is formed in part 2 in this form of mold to receive the valve stem of the inner tube.

In Fig. 4 the mold is shown to be formed of three parts—9, 10 and 11, the parts 10 and 11 having opposed flanges 12 and 13 which are clamped together by means of clamp screws, one of which is shown at 14. The meeting edges of the parts 9 and the parts 10 and 11 of this form of mold are flanged and seated together as in the mold shown in Fig. 3.

In Fig. 5 of the drawings which, as before stated is my preferred form of mold, the same is formed in four parts; 15, 16, 17 and 18—the parts 16 and 17 being provided with flanges 19 and 20 which are fastened to the opposed flanges 21 and 22 formed upon the part 18 by means of clamp-screws indicated at 23 and 24. The part 15 is seated upon the parts 16 and 17 in the same manner as has already been described in connection with the construction shown in Figs. 3 and 4.

In Fig. 6 the mold is shown as being constructed of two parts, 25 and 26 respectively, which have their meeting edges flanged and seated together in the manner already described in connection with the embodiment of my invention shown in Figs. 3 to 5 inclusive.

In all these constructions of molds the freely meeting or engaging parts are held together by a plurality of adjustable clamping members or straps of the type illustrated in Fig. 2 of the drawing.

These straps or clamps, it will be noted, are composed of two parts indicated at 27 and 28, hinged together as at 29 so that when said straps are positioned about the mold they completely encircle same. Part 27 of the strap is provided with a flange 30, to which is pivoted at 31 the handle 32, said handle being bifurcated as at 33, so that the bifurcated portion thereof can engage with the flange 33 provided upon part 28 of the clamp or strap, the construction being such, that when the clamps are fastened about the mold, the engagement of seat 34 with the surface of the flange 33 holds the parts or section of the mold in air or gas tight engagement.

Referring now to Figs. 7 to 9 inclusive, the part 35 of the mold which corresponds with the parts 2, 11, 17 and 26 of the embodiment of the mold shown in Figs. 3 to 6 inclusive is provided with a substantially square aperture 36, the walls of which are beveled inwardly as shown at 37. This aperture extends interiorly through the edge of the part 35. Adapted to be received in the aperture 36 is a removable section or plate 38, the edges of which are beveled as at 39 so that said plate will exactly fit said aperture as shown in Fig. 9. The engaging bevel surfaces, however, of the plate and the part 35 preventing the plate from being moved in an outward direction from the section 35 of the mold. The upper edge of the plate is provided with a flange 40 which engages a flange 41 performed upon the part 42 of the mold, said part 42 of the mold and said plate fitting together in the manner as do the parts of the mold shown in the previously described embodiment of my invention.

Plate 38 is provided with a threaded-outwardly-extending stud or bolt 43, said bolt being rigidly secured to the plate as shown. This bolt is adapted to receive a bridge or spanning member 44, the ends 45 and 46 of which extend across the aperture 36 and engage with the exterior surface of the part 35 so that when the nut 47 is threaded upon the outer end of the bolt 43 the plate 38 may be tightly clamped in the wall of the part 35 which forms the aperture 36. The lower edge 48 of the aperture 36 and the part 35 of the mold is provided with a semi-circular aperture 49 which registers with a correspondingly formed aperture 50, formed in the plate 38. These two semi-circular apertures, when the plate 38 is positioned in the aperture 36, receive the valve stem 51 of the inner tube 52, as clearly shown in Fig. 7 of the drawing.

Having thus described this embodiment of my invention, the manner in which the same is employed in practice may now be understood. Referring to the Fig. 7 of the drawings and to the form of mold illustrated therein; the manner of inserting the tubes to be vulcanized within the mold is as follows:

Assuming the clamping members to have been removed from the mold, the part 41 may, of course, be lifted off, whereupon the plate 38 may be loosened by loosening the nut 45 so that said plate may be moved upwardly up out of its aperture 36. The tube of raw material to be vulcanized having had the valve stem temporarily fastened therein may thereupon be deposited in the part 35 of the mold so that the valve stem 49 will lay in the aperture 36. The plate 38 is then reinserted in its aperture so that the aperture 48 thereof will engage with the valve stem. The plate is then fastened securely to the wall of part 35 of the mold by manipulation of the nut 45. The removable section 41 of the mold is then positioned upon the section 35 thereof, and the clamp members such as described in connection with Fig. 2 are positioned upon the mold, whereupon all the parts are located together.

At this point, it may be noted that I prefer to provide a circumferentially disposed rib or flange 53 upon the part 35, which rib or flange is adapted to be engaged with a shoulder 54 provided upon the part 27 of the clamp and I prefer to arrange the meeting edges of the parts 27 and 28 of the clamp so that they will come opposite or approximately opposite the meeting edges of the parts 35 and 41 of the mold. This arrangement provides a construction whereby the parts of the mold are held together with a substantially uniform pressure.

In removing the vulcanized tube from the mold, the operations of the above-described operations are substantially repeated, that is to say that the clamps are removed from the mold, the part 41 is lifted off and the plate 38 again removed, whereby the entire vulcanized tube carrying the valve stem may be readily lifted from without the part 35.

It will accordingly be seen that I provide a construction well adapted, among others, to allow all the ends and objects pointed out, in an exceedingly simple manner. By reason of my arrangement of parts, the unvulcanized tube may be inserted in the mold with a great deal of facility, the arrangement permitting the raw tube to be inserted within the mold so that there is no danger of the tender raw material being stretched or distorted.

The detachable cap piece may be readily positioned upon its mating-section without danger of pinching the raw tube and the manner of inserting the tube into the mold eliminates all danger of the mounting of the valve stem upon the tube being disturbed during the operation.

Moreover, the vulcanized tube may be removed from the mold with equal facility.

As many changes could be made in this construction without departing from the scope of the following claims, it is intended that all matter contained in the above description or shown in the accompanying drawing shall be interpreted as illustrative only and not in a limiting sense.

Having thus described my invention, what I claim as new and desire to secure by Letters Patent is:

1. A mold for pneumatic tubes comprising a plurality of members adapted to be fitted together so as to provide a tubular structure, one of said parts being provided with an aperture, a removable plate adapted to close said aperture, the edges of said aperture and plate being beveled to engage each other and provided with corresponding openings to receive a valve stem, and detachable means for maintaining the plate and aperture in engagement.

2. A mold for pneumatic tubes comprising a plurality of members adapted to be fitted together so as to provide a tubular structure, means for clamping said parts together, one of said parts being provided with an aperture which extends inwardly from the edge thereof, a plate fitted to said aperture, and means for clamping said plate to the edges of said aperture.

3. A device of the class described comprising a plurality of circular members adapted to be fitted together so as to provide a tubular structure, one of said parts being provided with an aperture which extends inwardly from an edge thereof, the edges of said part defining said apertures being beveled, a plate having beveled edges adapted to engage with the edges of said part whereby said plate will close said aperture, and means for clamping said plate to said part so that the beveled edges thereof are held in engagement with the aforesaid beveled edges of said part.

4. A mold for pneumatic tires comprising a plurality of members adapted to be fitted together so as to provide a tubular structure, one of said parts being provided with an aperture extending inwardly from the edge thereof, a removable plate adapted to close said aperture, and means spanning said aperture and connected with said plate adapted to clamp the latter to the edges of said aperture.

5. A mold for pneumatic tires comprising a plurality of members so shaped and adapted to be fitted together to provide a tubular structure of eliptical cross-section having two relatively flat sides, one of said sides being provided with an aperture, and a removable plate adapted to close said aperture and means for securing the plate in the aperture.

6. A mold for pneumatic tubes comprising a plurality of members adapted to be fitted together so as to provide a tubular structure, one of said parts being provided with an external circumferentially extending rib, and a plurality of removable clamping members each of which encircles said tubular structure and is provided with a shoulder that engages said rib, adapted to clamp said parts together.

7. A mold for pneumatic tubes comprising a plurality of members adapted to be fitted together so as to provide a tubular structure, one of said parts being provided with a circumferentially extending rib, a plurality of clamping members each of which encircles said tubular structure and engages said rib, adapted to clamp said parts together, one of said parts being provided with an aperture into which the valve stem of a tube to be vulcanized may be laterally inserted, a removable plate adapted to close the aperture about said valve stem, and means for holding said plate in position in said aperture.

8. A device of the class described, comprising a plurality of circular members adapted to be fitted together so as to provide a tubular structure, one of said parts being provided with an aperture extending inwardly from an edge thereof, said aperture being adapted to receive the valve stem of a tube to be vulcanized, a plate adapted to close said aperture about said valve stem, and means spanning said aperture and connected with said plate, adapted to hold the latter in engagement with the edges of said aperture.

In testimony whereof I affix my signature in the presence of two witnesses.

WALTER L. FAIRCHILD.

Witnesses:
EMMA WEINBERG,
IRVING A. HAMER.